United States Patent [19]
Koontz, deceased et al.

[11] Patent Number: 5,284,018
[45] Date of Patent: Feb. 8, 1994

[54] INTERNAL COMBUSTION ENGINE WITH EXHAUST TURBINE

[76] Inventors: Lamont B. Koontz, deceased, late of Tallahassee; by Hazel Koontz, executor, 2408 Napoleon Bonaparte, Tallahassee, both of Fla.

[21] Appl. No.: 920,886
[22] Filed: Jul. 28, 1992
[51] Int. Cl.⁵ .................. F02B 41/10; F01N 5/04
[52] U.S. Cl. ..................... 60/614; 60/280; 60/319; 181/262; 415/188
[58] Field of Search .......... 60/280, 319, 606, 614, 60/617; 181/262; 415/188, 202

[56] References Cited

U.S. PATENT DOCUMENTS

| | | |
|---|---|---|
| 1,014,401 | 1/1912 | Lake ............................ 60/614 X |
| 1,082,267 | 12/1913 | Groshon ..................... 415/188 X |
| 1,319,100 | 10/1919 | McElrath . |
| 2,024,834 | 12/1935 | Rippe ............................ 181/262 |
| 2,147,074 | 2/1939 | Wyman . |
| 2,188,444 | 1/1940 | Sauer . |
| 2,277,471 | 3/1942 | Wydler . |
| 2,297,425 | 9/1942 | Meissner ..................... 60/319 X |
| 2,379,455 | 7/1945 | Prince . |
| 2,503,410 | 4/1950 | Pouit . |
| 2,608,818 | 9/1952 | Shelley et al. . |
| 2,773,348 | 12/1956 | Grieshaber et al. . |
| 2,899,797 | 8/1959 | Birmann . |
| 3,153,318 | 10/1964 | Tryhorn et al. . |
| 3,221,492 | 12/1965 | Carletti . |
| 3,352,104 | 11/1967 | Duerr . |
| 3,423,926 | 1/1969 | Nancarrow et al. . |
| 3,442,077 | 5/1969 | Youhouse . |
| 3,672,160 | 6/1972 | Kim . |
| 3,827,236 | 8/1974 | Rust . |
| 3,928,971 | 12/1975 | Spath ............................ 60/614 |
| 4,010,607 | 3/1977 | Hopping ...................... 60/274 |

*Primary Examiner*—Michael Koczo
*Attorney, Agent, or Firm*—Allegretti & Witcoff, Ltd.

[57] ABSTRACT

An internal combustion engine according to the present invention is comprised of a conduit means that directs the flow of exhaust from an internal combustion engine to a relatively low speed turbine connected to a generator. The conduit means also acts as a mixing means for mixing appreciable quantities of outside air with the exhaust for recombustion prior to entry into the turbine. The turbine is designed to utilize the energy of the recombusted gases through impact and redirection of the gases upon the turbine blades. This invention comprises a dual function conduit means connecting internal combustion engine exhaust to a relatively low speed turbine wherein the conduit means also induces an appreciable flow of outside air to mix with the exhaust gases to effectively lower the temperature of the gases imposed on the turbine but without lowering the total energy of the gases.

2 Claims, 3 Drawing Sheets

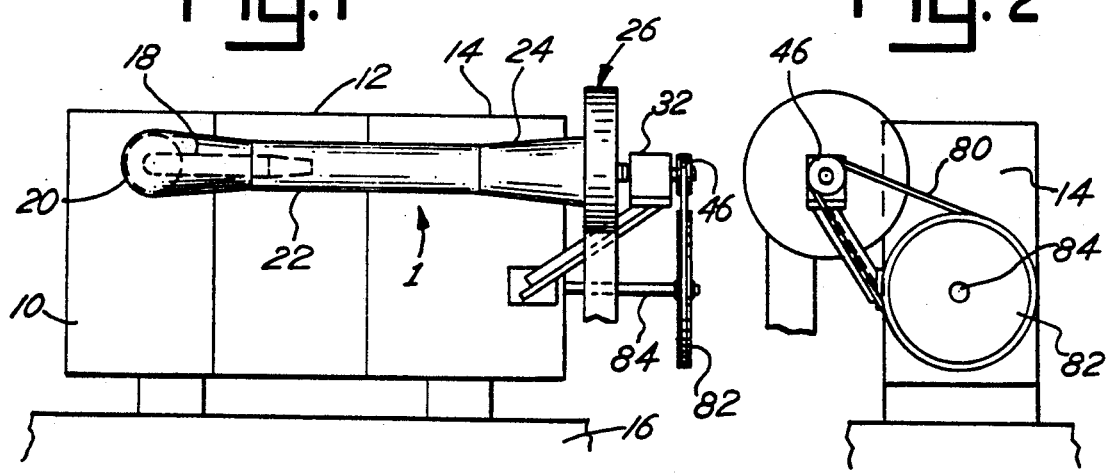
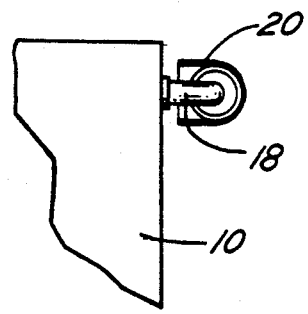
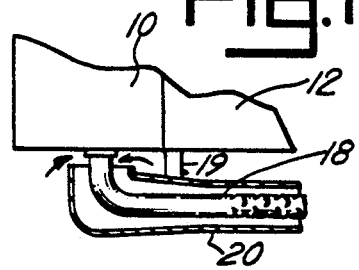
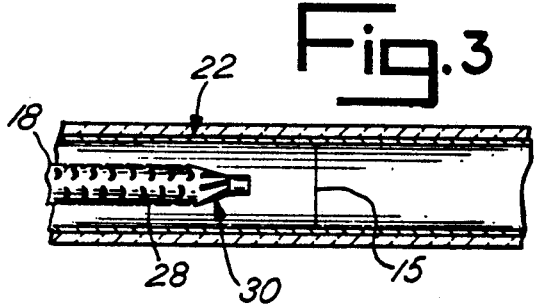
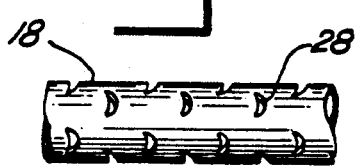
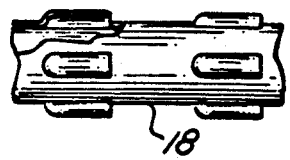

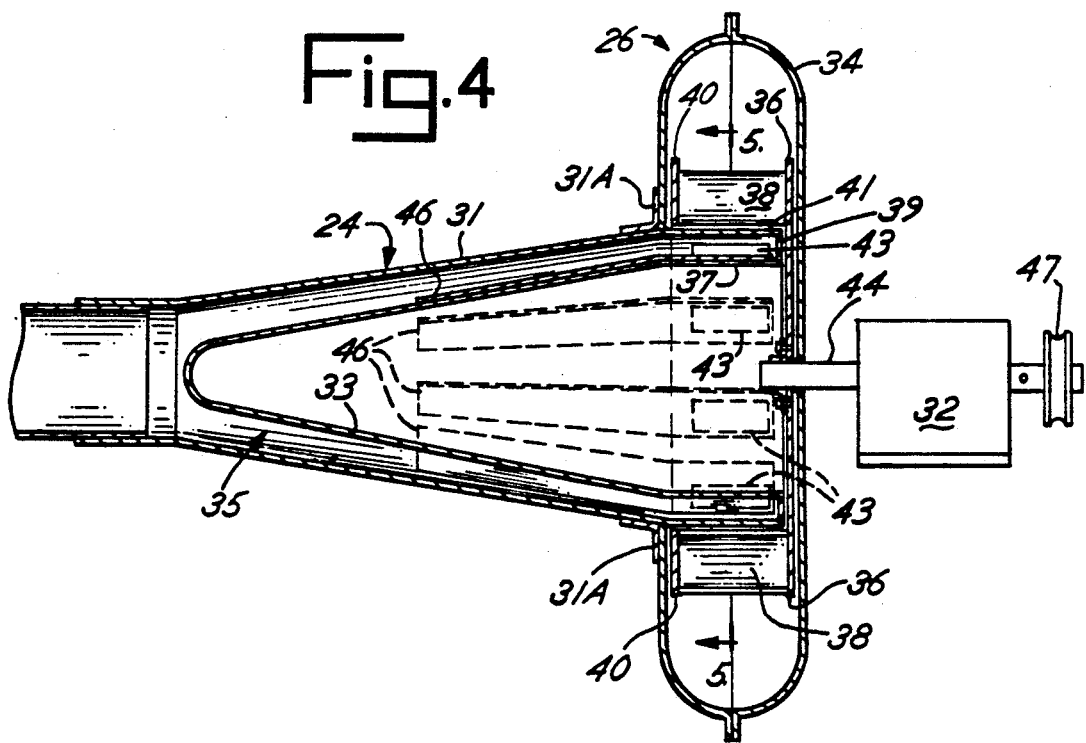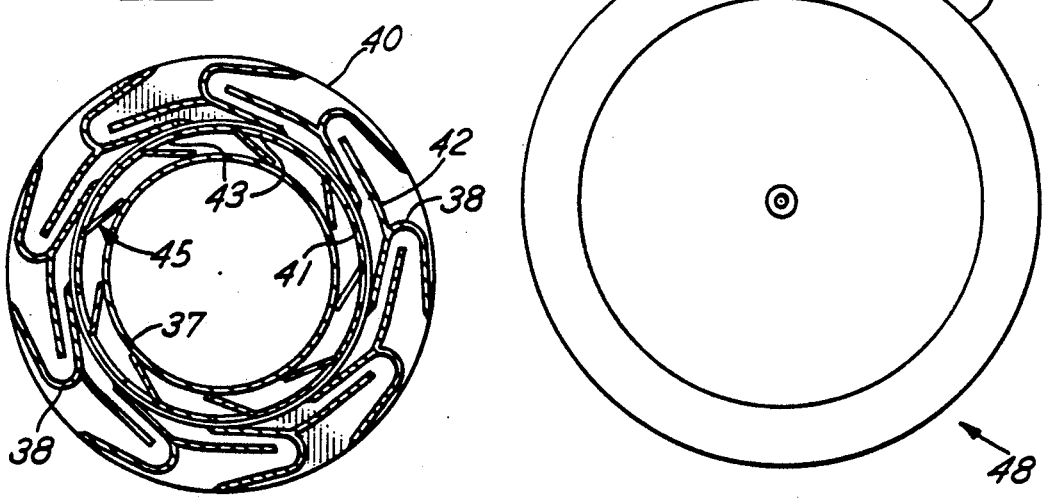

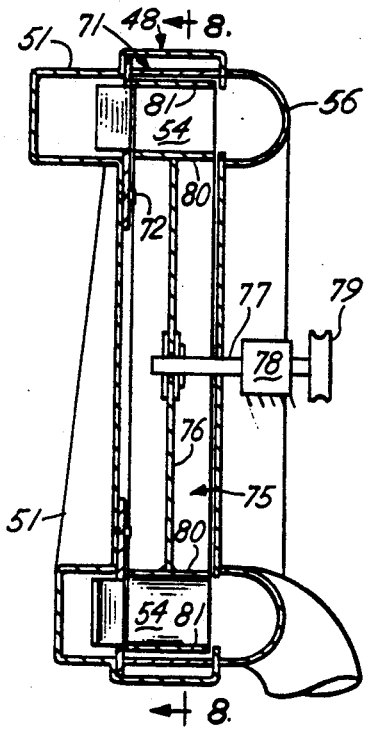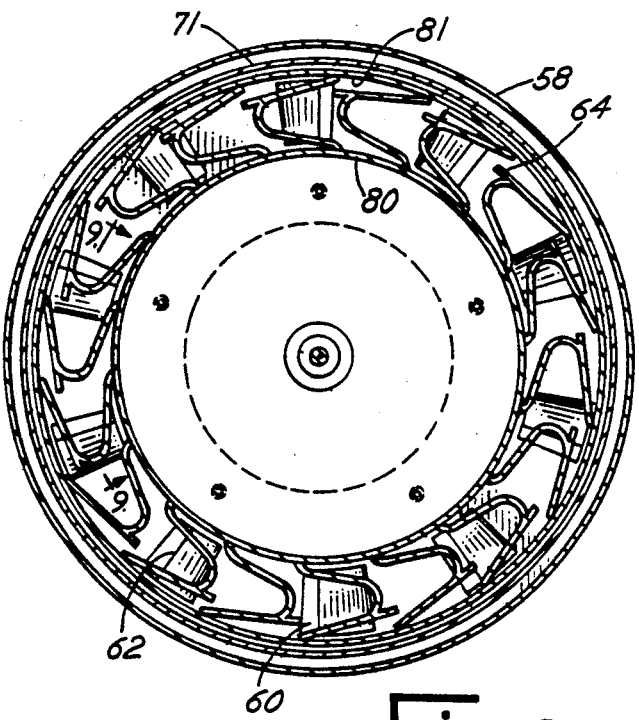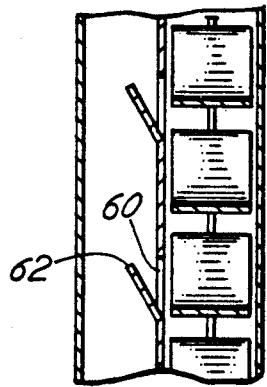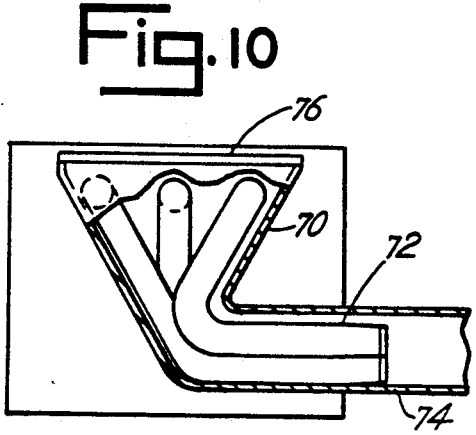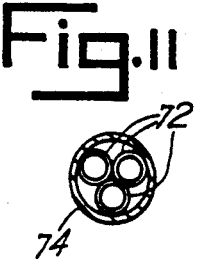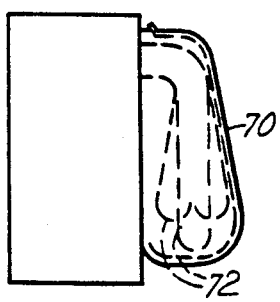

INTERNAL COMBUSTION ENGINE WITH EXHAUST TURBINE

BACKGROUND OF THE INVENTION

The present invention relates to internal combustion engines, and more particularly to means for effectively obtaining useful power from the exhaust emissions from an internal combustion engine.

The exhaust emissions from an internal combustion engine are at relatively high temperatures, relatively low pressures and at high velocity. The total energy of the emissions is generally estimated to be approximately thirty percent of the energy of the fuel burned, but there are many variables such as load on the engine, compression ratio, type of fuel, condition of the engine and various others, that may affect this total.

This invention involves reducing exhaust temperatures and velocity by inducing the flow of appreciable quantities of outside air and mixing the air with the exhaust gases. The mixture of additional air with the exhaust gases does several things:

1. The kinetic energy of the exhaust gases is retained but at lower velocity levels and with added mass (the air); and
2. The heat energy of the exhaust gases is retained but with lower temperatures and added mass.

Further, the heat energy of the mixture may be increased by the burning of combustibles in the exhaust gases such as carbon monoxide and unburned fuel. The lower velocities and temperatures of the exhaust gas mixture permit its use with a relatively low speed turbine, which in turn may be connected with engine driving means rather easily. The turbine in such a construction may be made of comparatively inexpensive material, compared with the common turbo superchargers which use exhaust gases going directly to the turbine, turning it at very high speeds and requiring expensive manufacture. Such turbines are practical for driving small high-speed compressor, but would be difficult to connect with an engine driving means.

The exhaust temperature of the engine depends on a multitude of variables but generally will be in the range of 200-400 degrees Fahrenheit at the low end and about 1600 degrees Fahrenheit on the high end. In this invention, the mixed gas temperature is expected to be within the appropriate range of 200-800 degrees Fahrenheit, but these temperatures are not considered limitations.

SUMMARY OF THE INVENTION

An internal combustion engine according to the present invention is comprised of conduit means that directs the flow of exhaust from an internal combustion engine and induced outside air to a turbine connected to a load such as a generator. The conduit means includes an exhaust pipe and means for mixing appreciable quantities of outside air with the exhaust prior to entry into the turbine. This mixing has a further benefit of burning previously unburned gaseous fuel. The turbine is designed to utilize the energy of the mixed gases through impact and reversal of direction of the gases upon the turbine blades.

An object of the present invention is to provide an internal combustion engine that obtains increased useful power from exhaust emissions.

A further object of the present invention is to provide an internal combustion engine that minimizes undesirable emissions and reduces exhaust noise, while obtaining increased useful power from the exhaust emissions.

An additional object of the present invention is to provide an internal combustion engine that obtains increased useful power from exhaust emissions, minimizes undesirable emissions and exhaust noise, all without appreciably increasing back pressure on the engine.

These and further objects, features, aspects and advantages of the present invention will become more apparent from the following detailed description of the present invention when taken in conjunction with the accompanying drawings.

BRIEF DESCRIPTION OF THE DRAWINGS

The attached drawings illustrate presently preferred embodiments of the present invention, wherein like numerals refer to like elements in the various views and wherein;

FIG. 1 is a lateral side elevation of the invention connected to an internal combustion engine;

FIG. 1A is a rear elevation of the invention corresponding to FIG. 1, and showing the spatial relationship between an engine and the invention;

FIG. 1B is a top sectional view of the invention, showing the spatial relationship of an exhaust pipe inside of a cover or conduit;

FIG. 2 is a front elevation of the invention corresponding to FIG. 1;

FIG. 3 is an enlarged sectional view of the invention, showing an exhaust pipe inside of a cover or outer conduit;

FIG. 3A is a detailed view of a surface of an exhaust pipe in one embodiment of the invention;

FIG. 3AA is a detailed view of a surface of an exhaust pipe in a second embodiment of the invention;

FIG. 4 is a sectional side view of a turbine portion of one embodiment of the invention;

FIG. 5 is a sectional view of a turbine assembly taken along the line 5—5 of FIG. 4;

FIG. 6 is a side view of a turbine portion of a second embodiment of the invention;

FIG. 7 is a front sectional view of the embodiment of the invention, corresponding to FIG. 6;

FIG. 8 is a front view taken along line 8—8 of FIG. 7, of an outlet nozzle and partition configuration of the embodiment of the invention shown in FIG. 7;

FIG. 9 is a sectional view of a portion of the turbine wheel and blade structure of the embodiment of the invention shown in FIG. 7;

FIG. 10 is a side view of an exhaust assembly in a third embodiment of the invention;

FIG. 11 is a front sectional view of the invention corresponding to FIG. 10;

FIG. 12 is a rear view of the invention corresponding to FIG. 10.

DESCRIPTION OF THE PREFERRED EMBODIMENT

Referring to the drawings, FIG. 1 shows a first embodiment of the invention 1, in use with an internal combustion engine 10. As can be seen in FIG. 1, an engine 10, a coupling and control unit 12 and a generator 14 are connected in a manner well known in the art, with each being mounted on a base 16. The engine 10 has an exhaust pipe 18, (shown in dotted lines) part of which is enclosed by a tapered cylindrical cover or conduit 20.

The larger diameter portion of the cover 20 facing the engine 10 is spaced from the engine 10 to permit outside air to flow into the cover 20 and around pipe 18 as shown in FIGS. 1A and 1B. Cover 20 is suitably connected to the engine 10 for support by means such as bracket 19. Cover 20 tapers down to the diameter of tube 22 and is attached thereto slightly upstream of a perforated portion of pipe 18. Tube 22 is in fluid communication with conical member 24 which is in turn connected to and in fluid communication with turbine 26. Note that pipe 18 extends into tube 22 as shown in FIGS. 1 and 3.

Exhaust pipe 18 has a perforated portion with a plurality of slanted cuts 28 as shown in FIGS. 3 and 3A, or exhaust pipe 18 may have other configurations such as that shown in FIG. 3AA. The configuration of the pipe 18, and tube 22 are for the purpose of permitting exhaust flow through pipe 18 to induce the flow of air into surrounding tube 22 and to mix the air and gases. It is important that the openings in pipe 18 are of such total flow capacity as to not appreciably restrict the flow of pipe 18. Note that the flow capacity of cover 20 is relatively large; the flow capacity between pipe 18 and tube 22 is reduced and the capacity of 22 beyond the pipe 18 is the total or full flow of exhaust gas and the induced air. Thus, from a flow standpoint, the reduction of flow capacity between pipe 18 and tube 22 amounts to a venturi which, by the reduction of pressure in the venturi section, expedites the flow of exhaust gases from pipe 18.

The exhaust gases are hot and cause exhaust pipe 18 to be hot and both the hot gases and the hot pipe serve to heat the surrounding flow of outside air. The induced air flow provides plenty of oxygen to support combustion of any unburned portions of the exhaust gases. To assist this combustion, state of the art catalytic means such as platinum wire 15 (shown in FIG. 3) may be used. Cover 20, tube 22, member 24 and the turbine 26 are all well insulated as suggested by FIG. 3, the insulation not being shown for all elements.

Referring to FIGS. 4 and 5, turbine 26 includes a housing 34, a turbine wheel 36 having blades 38 and an annular ring 40, said blades or buckets 38 being attached to wheel 36 and ring 40. Blades 38 may include baffles 42 and are shaped as shown schematically in FIG. 5, said baffles causing the gas flow to follow the internal contour of the blades 38. Wheel 36 and its connected blades 38 and annular ring 40 are mounted on shaft 44 which extends through an opening in housing 34 to a bearing member 32. Bearing member 32 is not insulated as it must lose heat. As can be seen in FIGS. 1 and 4, shaft 44 extends through bearing member 32 and has a pulley 47 mounted on its outer end. Pulley 47 of turbine 26 is connected by belt 80 to a larger pulley 82 on shaft extension 84 of generator 14 so that power generated by turbine 26 can help drive generator 14 for example.

Referring again to FIGS. 4 and 5, conical member 24 directs gases from tube 22 to turbine 26, and includes an outer portion 31 and an inner portion 33. Inner portion 33 has a generally cone-shaped upstream portion 35 and a cylindrical portion 37 downstream, the cylindrical portion 37 also having a radial flange 39, the radial flange 39 being attached to the outer edge of outer portion 41, outer portion 41 being concentric with cylindrical portion 37. Flanges 31A attach conical member 24 to housing 34.

Referring to FIG. 5, outer portion 41 has a series of spaced outlets 43 around its periphery. From the left side of an outlet 43 (FIG. 5) a slant member 45, which may be integral with or attached to said left edge, is directed angularly down to cylindrical portion 37 to direct gas from the space between members 37 and 41 to the innermost edge of blades 38 and then follows the inner surface contour of 38 until it exhausts at the outermost edge of 38, as shown in FIGS. 4 and 5. Partition members 46, representative of similar members for each outlet 43, extend between members 31 and 33 and direct gaseous flow between the members to outlet ports 43, the partition members 46 being curved to change the flow between members 31 and 33 to the direction of rotation of the wheel 36 as gas approaches outlet 43. From the downstream portion of tube 22 through unit 24 and to the turbine blades 36, it is important that the flow passages are as direct and proportioned in size as to maintain a substantially, uniform flow rate.

The shape of blades or buckets, 38 is intended to reverse the flow of the exhaust gas/air mixture entering the blades 38 on one side and leaving on the ohter side. Baffles 42 are provided to insure that the gases follow the contour of the bucket 38 and do not take a shorter path. Note that the portion of the buckets intermediate the entry and exit side is circular, essentially half round and, serves to reverse the flow direction from the one side to the other. Reversing the flow as described uses up the kinetic energy of the gases and the relatively deep buckets 38 also provide room for expansion of the gases due to pressure drop and cooling of the heat in the gases which tends to cool the buckets 38 to some extent.

From the kinetic energy standpoint, with the blades 38 moving at the same speed as the gases, there is no power output from the turbine 26; with the blades 38 moving at half the speed of the gases, power is at a maximum. With no movement of the blades 38, there is maximum torque but no power. Thus, the output of this turbine 26 is an ideal supplement to an internal combustion engine which has low torque at low speed and higher torque at higher speeds. Obviously, these idealized characteristics are subject to practical problems of gas entry to the buckets 38 and exiting therefrom. In FIG. 5, centrifugal force helps the gases leave the blades 38 which is also helped by curving the outer edge of the blades as shown in FIGS. 5 and 9.

Instead of introducing gas to the turbine 26 radially, it may be directed at a ninety degree angle for example as shown in a second embodiment in FIGS. 6, 7, 8 and 9. In this second embodiment, housing 48 has a lesser overall diameter because the turbine wheel exhaust, instead of being radial, is axial. In this embodiment, gas from tube 50 goes through a circular inlet manifold 51 of decreasing depth, (FIGS. 6 and 7) and passes through blades 54 to an outlet manifold 56. FIG. 8 is a sectional view taken on the line 8—8 in FIG. 7. Note that the intermediate circular portion of the bucket 54 reverses the gas flow as it goes from inlet to outlet.

To provide the nozzle outlets in this modification, a circular member 58, (FIGS. 7, 8 and 9) has spaced openings 60 and slanted members 62 to direct the gases from the inlet manifold 51 to the outlet manifold 56 through blades 54. Note that the blades 54 have baffle members 64 attached thereto to insure that the gases must follow the blade contours before exiting. Circular member 58 is arranged inside housing 48 with its openings 60 being aligned with the circular opening of manifold 51 (FIG. 7), and the circular inlet opening 59 of housing 48. Circular member 58 is held in position by an outer spacer member 71 and a plurality of bolts 72 around the smaller diameter portion of circular member 58. The turbine wheel 75 of the modification has a circular disk 76 mounted on a shaft 77 which extends through bearing member 78 and has a pulley 79 thereon. Disk 76 has a flat faced ring 80 attached to its periphery and a similar radially spaced ring 81 is attached to ring 80 by the aforementioned buckets 54. Rings 80 and 81 thus form the top and bottom surfaces for buckets 54.

The above discussion relates to the invention as applied to a single-cylinder engine but it is equally useful with a plural cylinder engine as indicated in FIGS. 10, 11 and 12. In FIGS. 10 and 12, cover 70 corresponds to cover 20 in FIG. 1 and exhaust pipe 72 corresponds to exhaust pipe 18. The tube 74 corresponds to tubes 22 and 50. Adjustable flap 76 is used, if necessary, to adjust the flow of outside air.

"Appreciable quantities" as used herein, generally, refer to a flow of approximately equal to or greater than the exhaust flow from a mass standpoint. Obviously, less outside air than the above amount can easily take care of unburned hydrocarbons, but the purpose of this invention is to use outside air to reduce the temperatures of the exhaust gases and also to reduce their velocity to make feasible the use of cheaper materials and lower-speed turbine. Certainly, outside air in quantities somewhat below the mass flow rate of the exhaust can properly be used but each application should be considered on its own merits for the variables are many. All of the above described apparatus is intended to be insulated as previously discussed to conserve heat energy and to minimize noise.

Although presently preferred embodiments of the present invention have been described and illustrated in detail, it is to be understood that the same is by way of illustration and example only and is not to be taken by way of limitation. The spirit and scope of the present invention are limited only by the terms of the appended claims and their proper equivalents.

What is claimed:

1. An internal combustion engine comprising one or more cylinders and having one or more exhaust pipes for discharging hot exhaust gases at relatively high temperatures and velocity and at relatively low pressures, conduit means having a capacity in excess of that needed for said exhaust gases and enclosing said pipe or pipes, said conduit means having a portion open to outside air, wherein said conduit means has a flared collector portion adjacent to but spaced from said engine so that outside air may flow into said conduit means and around said exhaust pipe, said exhaust pipe in said conduit being downstream from said collector portion including a plurality of openings arranged to permit exhaust gases to exit from said exhaust pipe means in a direction to induce outside air to flow through said conduit means in the same direction as the exhaust flow and to mix said exhaust gases with the outside air at lower temperatures and velocities than the exhaust gases in the aforesaid pipe or pipes, gas turbine means connected to the conduit means to receive said mixed gases, said turbine means including a wheel, bearing means for the wheel, and power outlet means for the wheel, said wheel having a series of buckets, each having an inlet side, an outlet side and a curved intermediate portion connecting said sides and arranged so that gases flowing into the inlet side will be reversed at the intermediate portion and exit at the outlet side, a housing for said turbine wheel, said housing having an inlet portion and means permitting the exit of the gases discharged by the turbine wheel, the inlet portion having a plurality of shaped openings arranged to direct gases flowing into the inlet side of the wheel in a direction to travel along the inner inlet side of the buckets and following the surface contour of the buckets until it exhausts at the outlet side.

2. Apparatus for use with an internal combustion engine comprising means for conveying hot and high velocity gases from said engine, tapered conduit means spaced from said engine and substantially surrounding said conveying means and having its widest end sufficiently spaced from said engine to permit an inflow of outside air, further conduit means of substantially uniform inside diameter attached to the small end of said conduit means and having a flow capacity above that of said conveying means, said conveying means extending through said tapered covering means and into said conduit means for a relatively short distance, the downstream end portion of said conveying means having openings therein slanted in the general direction of flow in said conveying means, the total flow capacity of said openings being as large as that of the conveying means to assist in mixing said hot and high velocity gases with said outside air, and turbine means attached to the downstream end of said conduit means, said turbine means being configured to substantially utilize the kinetic energy of said mixed gases and also provide for expansion of the gases to thereby utilize the heat energy portion of the mixed gases.

* * * * *